United States Patent [19]
Redekop et al.

[11] Patent Number: 5,482,508
[45] Date of Patent: Jan. 9, 1996

[54] APPARATUS FOR CHOPPING AND DISCHARGING STRAW FROM A COMBINE HARVESTER

[76] Inventors: Leo L. Redekop; Helen E. Redekop, both of Box 178A, R..R#4, Saskatoon Saskatchewan, Canada, S7K 3J7

[21] Appl. No.: 414,735

[22] Filed: Mar. 31, 1995

[51] Int. Cl.⁶ .......................... A01F 12/40; A01F 29/02
[52] U.S. Cl. .............................. 460/112; 56/505
[58] Field of Search .................. 56/504, 505; 460/111, 460/112

[56] References Cited

U.S. PATENT DOCUMENTS

| | | | |
|---|---|---|---|
| 3,599,412 | 8/1971 | Lefeuvre | 56/505 |
| 3,678,671 | 7/1972 | Scarnato et al. | 56/505 |
| 3,693,335 | 9/1972 | Mathews | 56/294 |
| 4,631,910 | 12/1986 | Doyen et al. | 56/505 |
| 4,637,406 | 1/1987 | Guinn et al. | 460/112 |
| 5,042,973 | 8/1991 | Hammarstrand | 460/112 |
| 5,232,405 | 8/1993 | Redekop et al. | 460/112 |

*Primary Examiner*—Terry Lee Melius
*Attorney, Agent, or Firm*—Adrian D. Battison; Murray E. Thrift

[57] ABSTRACT

A chopper and discharge apparatus includes a stationary housing for attachment to the rear discharge of a combine harvester so that straw is fed from the combine into an inlet of the housing and is discharged from an outlet of the housing. Within the housing is mounted a hub for rotation about the horizontal axis with the hub carrying a plurality of lugs at angularly and axially spaced positions therearound, each lug carrying a pair of pivotal blade members which are rotated with the hub in the form of flails. Each lug is associated with a stationary blade on the inside of the housing so that the pair of blades carried on each lug sweep past the stationary blade each on a respective side of the stationary blade. The blade members include some flat cutting blades and some fan blade members which have a flap portion at a trailing edge of the blade which is bent outwardly at right angles and is also inclined outwardly and forwardly to generate a fan action in the air carried by the blade. There are more flat blades adjacent a center of the hub than adjacent the ends of the hub to increase fan action at the ends of the hub for increased discharge velocity. The fan blades include a connection which is offset to locate the center of gravity directly radially outwardly from the mounting on the lug.

20 Claims, 4 Drawing Sheets

FIG. I

APPARATUS FOR CHOPPING AND DISCHARGING STRAW FROM A COMBINE HARVESTER

BACKGROUND OF THE INVENTION

This invention relates to an apparatus for chopping and discharging straw from a combine harvester which includes a plurality of blade members mounted on a hub for rotation about an axis of the hub with the blade members being arranged at spaced positions along the length of the hub substantially in radial planes of the hub so as to pass between a plurality of axially spaced stationary blades again arranged in radial planes of the hub. The straw and other material discharged from the combine is fed into one side of the housing of the apparatus onto the hub and the material is carried around by the hub past the stationary blades in a chopping action. The material is then discharged from a discharge opening in the housing for collection or spreading across the field.

The present invention is particularly an improvement over the arrangement disclosed in U.S. Pat. No. 5,232,405 of the present inventors issued Aug. 3, 1993 based on an application filed Jan. 7, 1992. This arrangement shows a support plate lying in a radial plane and an additional plate or flap at right angles to the support plate to so that the additional plate lies longitudinally of the hub. The additional plate is inclined so that a radially outer edge of the additional plate lies angularly forwardly of a radially inner edge of the plate. The additional plate is welded across a trailing edge of the support plate and extends out to both sides of the support plate.

This arrangement has achieved some commercial and technical success and the present invention is directed to a yet further improvement which builds upon the improvement of the previous patent.

A further arrangement relevant to the present invention is that shown in U.S. Pat. No. 5,042,973 of Hammarstrand which discloses a similar chopping and discharge apparatus having rotating blade members carried on a hub and stationary blades fixed to the housing. The blade members are mounted in pairs so that a single lug carried on the hub supports a transverse pin parallel to the axis of the hub with the blade members mounted on respective sides of the lug and carried on bushings mounted on the pin. The blade members are spaced so that each blade member passes between two of the stationary blades in a cutting action. The blade members are shaped so as to be arch shaped in each cross section transverse to the length of the blade member thus defining a sharpened cutting edge at the leading edge and a sharpened cutting edge at the trailing edge with a center section of the blade bowed outwardly of a plane containing the leading and trailing edges. The blades are shown in face to face or back to back arrangements of the pairs.

A yet further arrangement is shown in U.S. Pat. No. 3,693,335 (Mathews) which shows blades which are inclined from the normal radial plane so as to extend outwardly from the hub in a direction which is inclined to the radial and axial directions.

SUMMARY OF THE INVENTION

It is one object of the present invention to provide an improved chopper and discharge apparatus of the same general type as shown in the above patent of the present inventor and which is modified so as to provide an improved chopping effect while reducing horsepower use and maintaining or increasing the distribution effect.

It is a further object of the present invention to provide an improved apparatus of the above general type which is simpler and more accurate for manufacture.

According to one aspect of the invention there is provided a chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising; a housing having a feed opening and a discharge opening, a plurality of stationary blades mounted in the housing in axially spaced positions therealong, the stationary blades lying in parallel radial planes; a chopping assembly mounted in the housing and comprising a hub member mounted for rotation about a longitudinal axis of the hub member and a plurality of blade members mounted on the hub member for rotation therewith about said axis, each blade member projecting generally outwardly from the hub member substantially in a radial plane of said axis, the blade members being arranged at spaced positions along the length of the hub member such that rotation of the hub member causes each blade member to pass between two of the stationary blades in a cutting action; the feed opening being arranged to deposit the material onto the chopping assembly in a direction generally inwardly toward the axis and the discharge opening being arranged to allow discharge of the material generally radially outwardly from the chopping assembly; each of at least some of the blade members defining fan blade members including a first cutting portion which includes a sharpened leading edge lying in a radial plane of the axis and a trailing edge, and a second flap portion bent from the first portion at the trailing edge of the first portion so as to be contiguous with the first portion at the trailing edge and to extend from the trailing edge of the first portion outwardly to one side only of the radial plane and including a side edge of the flap portion opposite to the trailing edge which is spaced axially of the radial plane.

According to a second aspect of the invention there is provided a chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising; a housing having a feed opening and a discharge opening, a plurality of stationary blades mounted in the housing in axially spaced positions therealong, the stationary blades lying in parallel radial planes; a chopping assembly mounted in the housing and comprising a hub member mounted for rotation about a longitudinal axis of the hub member and a plurality of blade members mounted on the hub member for rotation therewith about said axis, each blade member projecting generally outwardly from the hub member substantially in a radial plane of said axis, the blade members being arranged at spaced positions along the length of the hub member such that rotation of the hub member causes each blade member to pass between two of the stationary blades in a cutting action; the feed opening being arranged to deposit the material onto the chopping assembly in a direction generally inwardly toward the axis and the discharge opening being arranged to allow discharge of the material generally radially outwardly from the chopping assembly; some of the blade members defining fan blade members including a first planar cutting portion which lies in a radial plane of the hub axis and a second flap portion at a trailing edge of the first portion extending from the trailing edge of the first portion outwardly to at least one side of the radial plane; some of the blade members defining flat blade members each of which is defined solely by a planar cutting portion lying in a radial plane of the hub axis; wherein there are more flat blade members adjacent a center of the hub member than adjacent ends of the hub member.

According to a third aspect of the invention there is provided a chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising; a housing having a feed opening and a discharge opening, a plurality of stationary blades mounted in the housing in axially spaced positions therealong, the stationary blades lying in parallel radial planes; a chopping assembly mounted in the housing and comprising a hub member mounted for rotation about a longitudinal axis of the hub member and a plurality of blade members mounted on the hub member for rotation therewith about said axis, each blade member projecting generally outwardly from the hub member substantially in a radial plane of said axis, the blade members being arranged at spaced positions along the length of the hub member such that rotation of the hub member causes each blade member to pass between two of the stationary blades in a cutting action; the feed opening being arranged to deposit the material onto the chopping assembly in a direction generally inwardly toward the axis and the discharge opening being arranged to allow discharge of the material generally radially outwardly from the chopping assembly; each of at least some of the blade members defining fan blade members including a first cutting portion which includes a sharpened leading edge lying in a radial plane of the axis and a trailing edge, and a second planar flap portion bent from the first portion at the trailing edge of the first portion substantially at right angles thereto so as to be contiguous with the first portion at the trailing edge and to extend from the trailing edge of the first portion outwardly to one side only of the radial plane; wherein each fan blade member includes a connection portion contiguous with the first portion and extending therefrom to a support member on the hub member, the connection portion lying in a radial plane offset to a side of the radial plane of the first portion opposite to the second portion so as to balance the center of gravity of the blade member to lie radially outwardly of the connection portion.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
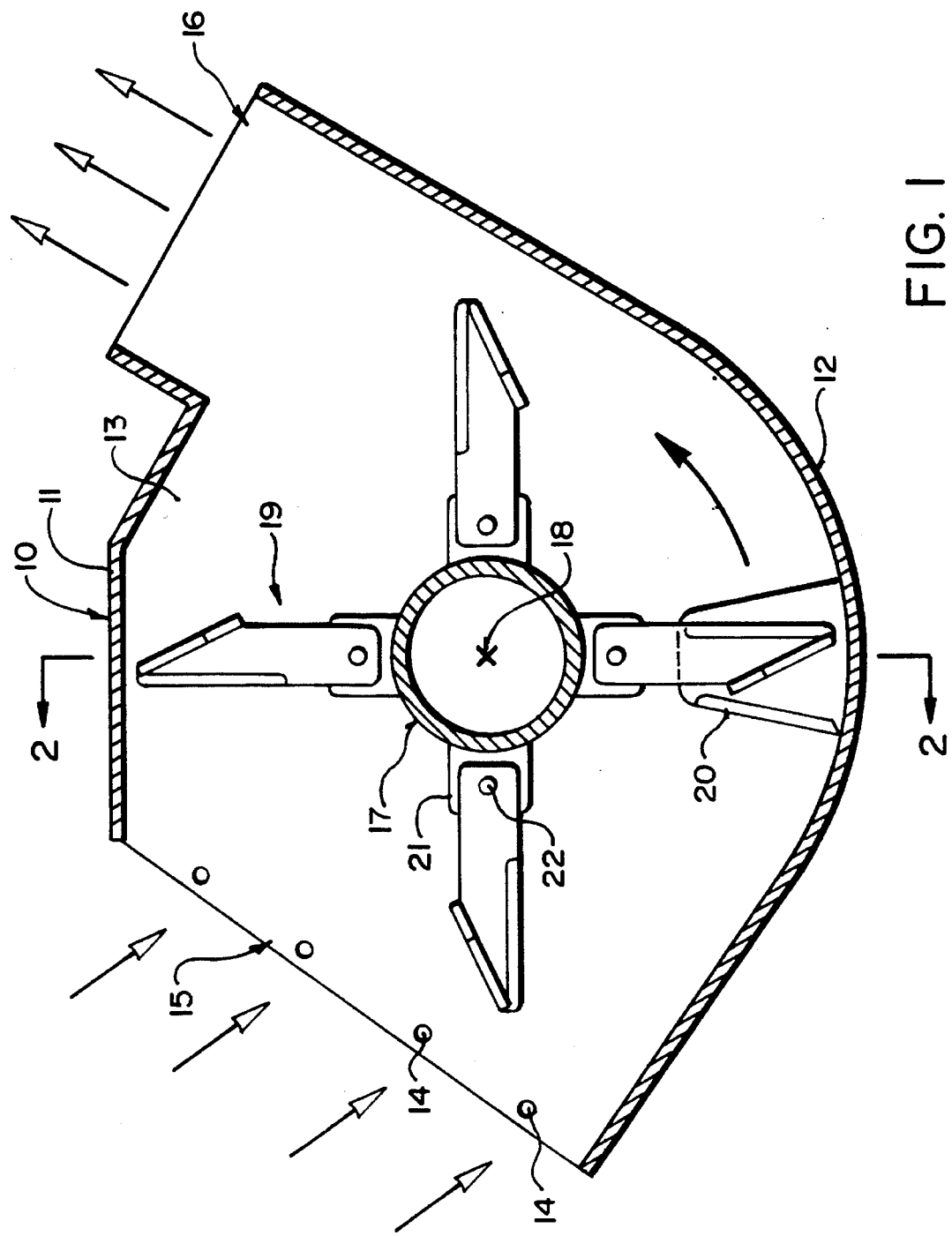
FIG. 1 is a vertical cross sectional view through a chopper and distribution apparatus according to the present invention.

The chopper and discharge arrangement shown in FIG. 1 is very similar to that from the above prior patent of the present inventor which is U.S. Pat. No. 5,232,405 the disclosure of which is incorporated herein by reference. The apparatus therefore comprises a housing 10 defined by a top wall 11, a bottom wall 12 and two end walls 13. The end walls 13 include attachment means schematically indicated at 14 for attachment of the housing to the outlet of a combine harvester for discharge of straw and possibly chaff from the combine harvester into an inlet opening 15 of the housing 10. The bottom wall 12 defines a semi-cylindrical portion extending from the inlet 15 to an outlet 16 through which chopped straw and air is discharged at relatively high velocity for spreading across the field or for transportation into a container.

Within the housing is mounted a hub 17 which is carried on suitable bearings (not shown) for rotation about a hub axis 18 at a center of the housing so that blade members 19 carried by the hub sweep around within the housing to entrap straw fed through the inlet 15 and to carry the straw and air passed stationary blades 20 for chopping and for discharge through the outlet 16. The stationary blades 20 are mounted on the housing at a position approximately midway between the inlet 15 and the outlet 16 so that the blade members 19 sweep between the stationary blades in a cutting action.

The hub 17 carries a plurality of lugs 21 at angularly and axially spaced positions therealong with each lug mounting a pair of blade members as described in more detail hereinafter for pivotal movement of the blade members about a pin 22 parallel to the axis 18.

Figure 2:
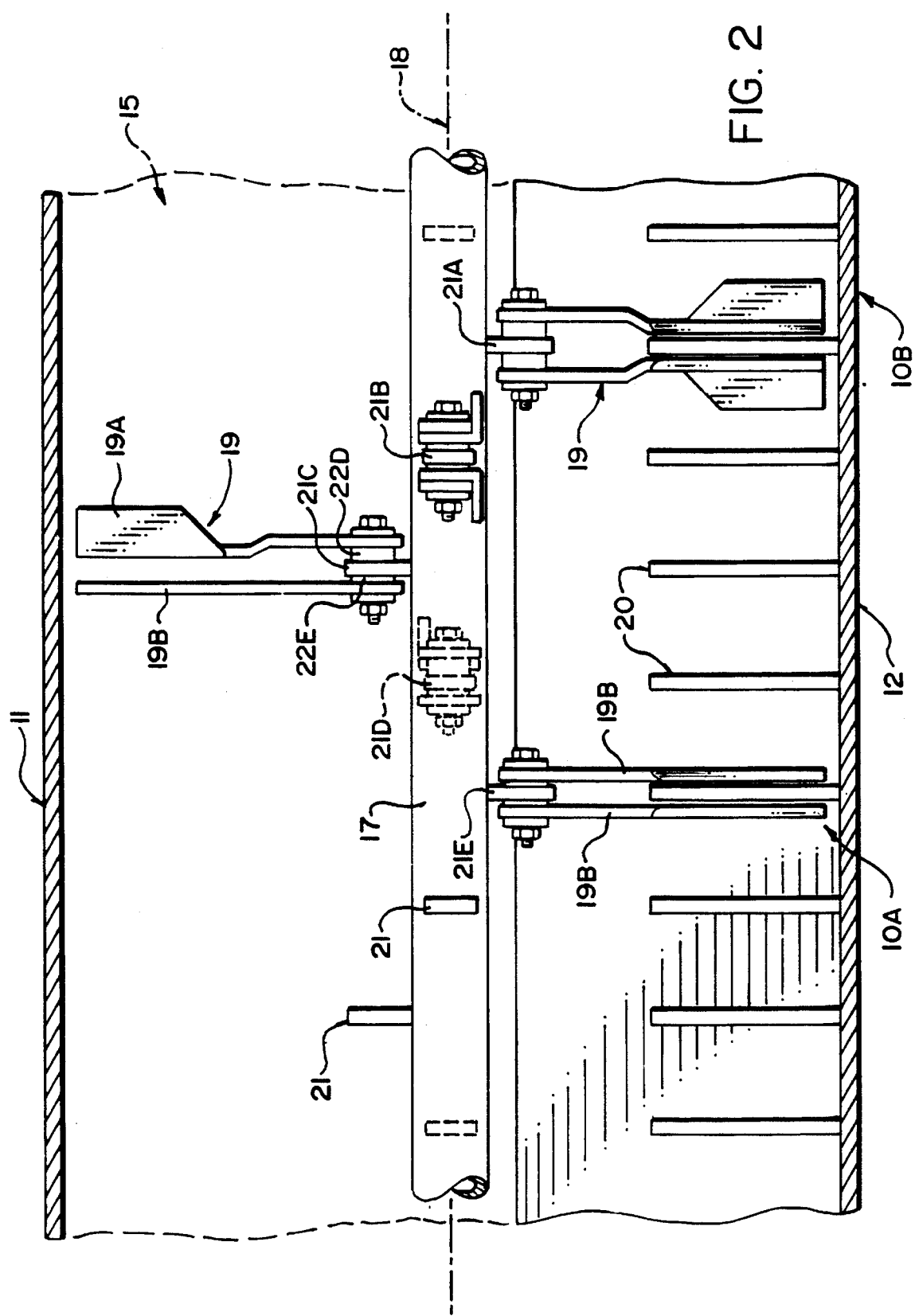
FIG. 2 is a cross sectional view along the lines 2—2 of FIG. 1.

From FIG. 2 it will be noted that the lugs 21 are arranged in a spiral pattern around the hub 17. Thus one of the lugs indicated at 21A is in the orientation of the hub 17 as shown arranged vertically below the hub. A next one of the lugs 21B is arranged on the hub at 90° from the first lug 21A. The next lug 21C is arranged at 90° from the second lug 21B and thus extends vertically upwardly in the orientation as shown. The pattern then continues through a fourth lug 21D and to a fifth lug 21E which is again aligned with the first lug 21A. Each of the lugs carries a pair of blade members. Each lug is aligned with a respective one of the stationary blades 20 so that each stationary blade has associated with it a respective one of the lugs and thus has associated with it the pair of blades carried by that lug. Each stationary blade is thus swept by the blade members once for each rotation of the hub with some of the stationary blades being swept at each of the four 90° positions of rotation of the hub.

The blade members include two types of blade members including fan blade members 19A and flat blade members 19B. Some of the lugs, for example 21A and 21B carry two of the fan blade members 19A. Some of the lugs, for example lug 21 E, carry two of the flat blade members 19B. Some of the lugs carry one fan blade member and one flat blade member. The blade members are arranged so that there are more of the flat blade members adjacent a center area 10A of the housing than at an area 10B of the housing which is adjacent one end. It will of course be appreciated that the amount of airflow generated by the fan blade members is significantly greater than that generated by the flat blade members. Thus an increase in the number of fan blade members adjacent the ends of the housing causes an increase in airflow in those areas and it is this airflow at the ends of the housing which assist in discharging the straw materials outwardly to the sides of the chopper. In the center area of the chopper there is less requirement for high air velocity and movement since the straw discharged at the center section is directed rearwardly from the chopper and hence does not require to be discharged over such a great distance. The use of flat blades at the center section reduces manufacturing cost and also reduces horse power requirements due to the reduced amounted of air movement at the center section.

Figure 3:
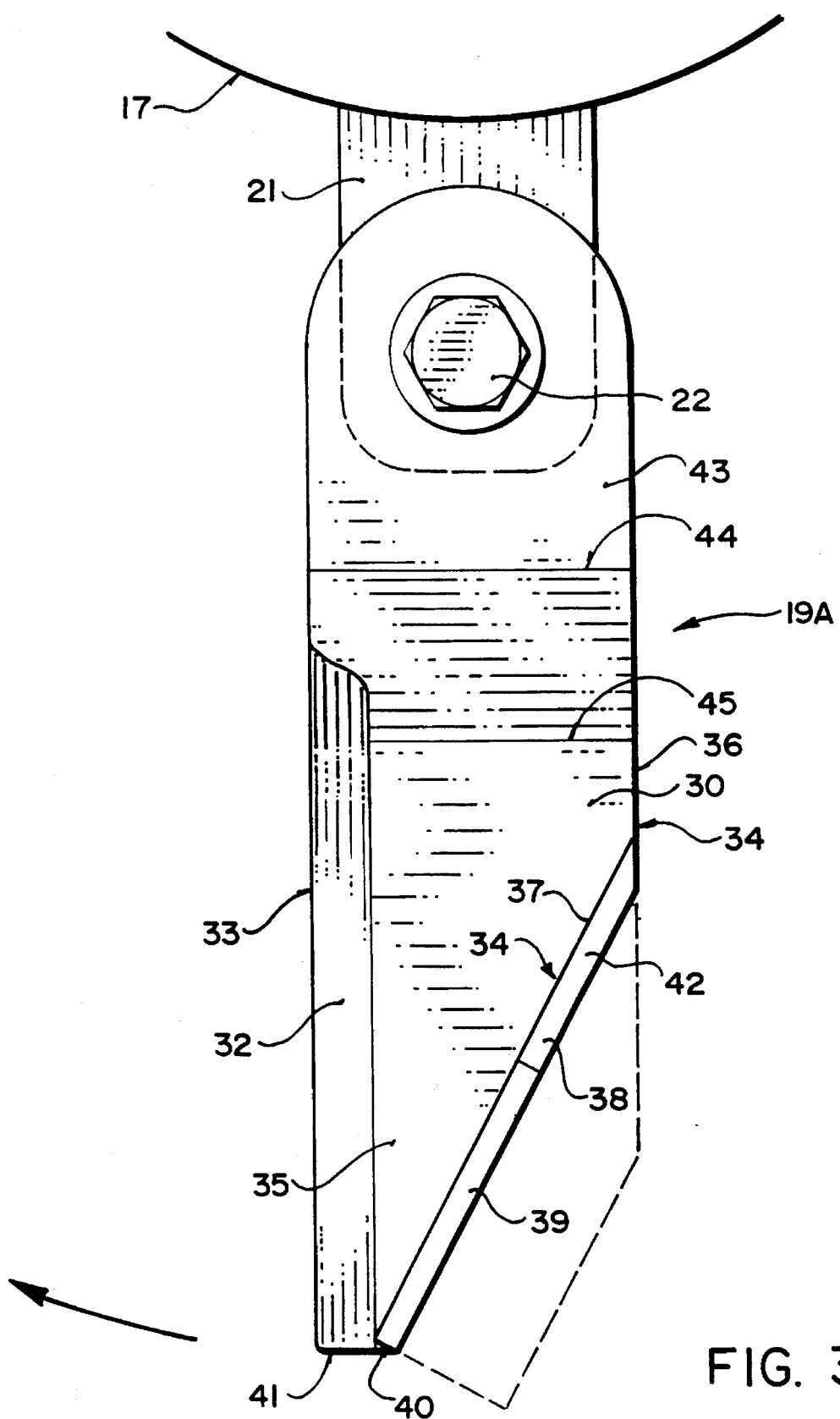
FIG. 3 is a side elevational view of one fan blade member of FIG. 1 on an enlarged scale.
Figure 4:
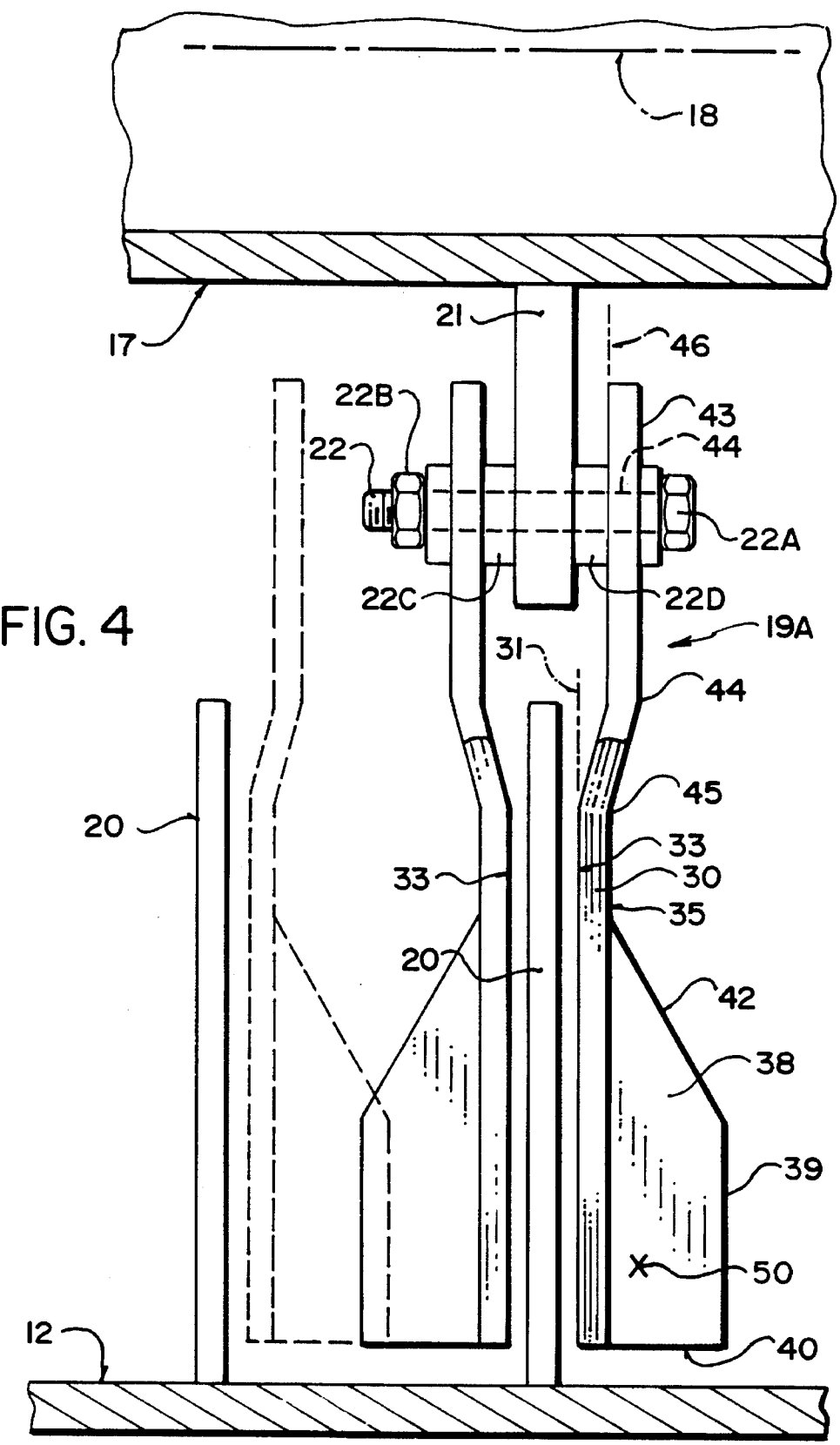
FIG. 4 is a front elevational view of the fan blade member of FIG. 3 on the same scale as FIG. 3.

Turning now to FIGS. 3 and 4, the fan blade members are shown in more detail. Each fan blade member comprises a first portion 30 which lies in a plane 31 which is radial to the axis 18. The first portion 30 is flat except that it includes at its leading edge 33 spaced forwardly of a trailing edge 34. The bevel 32 is arranged so that the leading edge 33 is on a side of the flat planar first portion 30 which lies immediately adjacent the stationary blade 20. From that leading edge the bevel 32 is inclined rearwardly and away from the stationary blade 20 to a second side surface 35 of the first portion 30.

The trailing edge 34 of the first portion of the blade includes a first portion 36 which is parallel to the trailing edge 33 and a second portion 37 which is inclined radially outwardly and forwardly from the portion 36 to a position immediately adjacent the bevel 32.

The blade 19A further includes a second flap portion 38 which is formed by bending the sheet metal forming the first portion at the trailing edge portion 37 outwardly at right angles to the plane of the first portion 30. The flap portion is thus planar and lies in a plane longitudinal of the axis 18. The flap portion has an outermost edge 39 parallel to the trailing edge portion 37 so that the width of the flap portion as shown best in FIG. 4 is constant from a mid height of the flap portion to a bottom edge 40 of the flap portion which is coextensive with a bottom edge 41 of the first portion 30 at the bottom of the bevel 32. The edge 40 is thus parallel to the axis and arranged closely adjacent the outer wall 12. An upper edge 42 of the flap portion is inclined upwardly and axially from the upper end of the side edge 39 to the point where it intersects with the trailing edge portion 36.

The first and second portions therefore are manufactured from bending a single piece of metal and the flap portion extends only to one side of the plane 31 containing the cutting edge 33.

The blade member 19A further includes a connection portion 43 with a hole 44 receiving the pin 22. The connection portion 43 is contiguous with the first portion 30 and includes two shallow bends 44 and 45 so that the connection portion 43 is parallel to the first portion. 30 but lies in a radial plane 46 which is axially offset from the plane 31 in the same direction as the direction of the bend of the flap portion so that a center of gravity approximately indicated at 50 lies directly radially outwardly from the connection portion 43 and lying approximately in the plane 46. Thus the centrifugal forces acting on the center of gravity tend to pull the fan blade member directly outwardly from the pin without any twisting of the blade on the pin 22.

The pin 22 is formed as a bolt with a head 22A and a nut 22B and supports bushings 22C and 22D which engage and carry the two fan blade members 19A carried on the pin 22. The bushings thus hold the fan blade members 19A at a required spacing relative to the lug 21 and thus relative to the stationary blade 20 to ensure passage of the cutting edge 33 as close as possible to the stationary blade without the danger of interengagement therebetween.

The fan blade members are arranged as pairs including a left hand member and a right hand member for engagement at respective ends of the pin 22. Thus the cutting edge 33 of each of the blades passes closely adjacent the stationary blade and the second flap portion 38 projects outwardly from that side of the first portion which is opposite to the stationary blade.

As explained in the above previous patent, the inclination of the second flap portion of the fan blade member so that a radially outer most end 40 thereof lies angularly forwardly of a radially inner trailing end 47 thereof generates a high level of air movement to pump air from the inlet through the outlet to generate high velocity in the straw pieces which are ejected from the outlet.

The fan blade member including the first portion, the second flap portion and the connecting portion are all formed from a single piece of sheet metal which can be stamped and bent to the required shape with a high degree of accuracy so that each blade member has the same weight and the same angles thus enabling the manufacture of the product to higher tolerances and increased balance of rotation of the blades about the hub axis.

As shown in FIG. 4, the positioning of the lugs 21 and the width of the flap portion is arranged relative to the spacing between the stationary blades so that a next adjacent fan blade member as it passes between the stationary blades overlaps the path of movement of its neighbor. In addition, the spacing of the stationary blades relative to the width of the fan blade is arranged so that the outside edge of the flap portion passes the next adjacent stationary blade at a greater spacing than the spacing between the cutting edge and the associated stationary blade but not at such a large spacing to exclude the cutting effect between the outside edge and its associated stationary blade. Each blade therefore passes between two stationary blade and causes a cutting effect in cooperation with both the stationary blades. The overlap also prevents any area of the housing which is not effectively swept by the fan blades as they rotate around the axis of the hub. In one example, the spacing between the stationary blades is of the order of 2.0 inches while the width of the fan blade is of the order of 1.25 inches giving an overlap of the order of 0.5 inches.

As shown in FIG. 2, the flat blade members 19B do not include the bend sections 44 and 45 so that the flat blade member lies in a common radial plane. For this reason the bushing 22E mounting the flat blade member 19B is narrower than the bushing 22D mounting the fan blade member. This ensures that the clearance between the cutting edge of the flat blade member and the cutting edge 33 of the fan blade member is equidistantly spaced from the stationary blade.

In an alternative arrangement (not shown) no flat blades are used so that all the blades are of the fan blade type. In a yet further arrangement, the blades are not mounted in pairs but are instead mounted on individual mounting lugs at the angular and axial spaced positions previously described.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising;

a housing having a feed opening and a discharge opening,
a plurality of stationary blades mounted in the housing in axially spaced positions therealong, the stationary blades lying in parallel radial planes;

a chopping assembly mounted in the housing and comprising a hub member mounted for rotation about a longitudinal axis of the hub member and a plurality of blade members mounted on the hub member for rotation therewith about said axis, each blade member projecting generally outwardly from the hub member substantially in a radial plane of said axis, the blade members being arranged at spaced positions along the length of the hub member such that rotation of the hub member causes each blade member to pass between two of the stationary blades in a cutting action;

the feed opening being arranged to deposit the material onto the chopping assembly in a direction generally inwardly toward the axis and the discharge opening being arranged to allow discharge of the material generally radially outwardly from the chopping assembly;

each of at least some of the blade members defining fan blade members including a first cutting portion which includes a sharpened leading edge lying in a radial plane of the axis and a trailing edge, and a second flap portion bent from the first portion at the trailing edge of the first portion so as to be contiguous with the first portion at the trailing edge and to extend from the trailing edge of the first portion outwardly to one side only of the radial plane and including a side edge of the flap portion opposite to the trailing edge which is spaced axially of the radial plane.

2. The apparatus according to claim 1 wherein the second flap portion of each fan blade member is inclined such that a radially outer part of the second flap portion is arranged angularly forwardly of a radially inner part of the blade surface portion.

3. The apparatus according to claim 1 wherein first portion including the leading and trailing edges is planar and wherein the second flap portion is planar.

4. The apparatus according to claim 1 wherein each fan blade member includes a connection portion contiguous with the first portion and extending therefrom to a support member on the hub member, the connection portion lying in a radial plane offset from the radial plane of the first portion in an axial direction which is the same as that of the second portion so as to balance the center of gravity of the blade member to lie radially outwardly of the connection portion.

5. The apparatus according to claim 4 wherein the first portion and a part of the connection portion are beveled at the leading edge thereof to form said sharpened leading edge at a surface of the first portion and the part of the connection portion which is opposite to the second portion.

6. The apparatus according to claim 1 wherein the second portion has an outer edge which lies in a common plane with an outer edge of the first portion, said common plane lying tangential to an imaginary cylinder surrounding the axis of the hub member.

7. The apparatus according to claim 6 wherein the second portion has an inner edge which is inclined from the trailing edge toward the side edge and toward the outer edge.

8. The apparatus according to claim 1 wherein the fan blade members are arranged in pairs with each one of a pair being arranged on a respective side of one of the stationary blades and with the second flap portion of said each one of the pair being arranged on a side of the first portion which is opposite to the stationary blade and opposite to the other one of the pair.

9. The apparatus according to claim 8 wherein each pair is mounted on a respective one of a plurality of lugs mounted on the hub member at spaced positions thereon, each lug having a pin mounted thereon with a pin axis of the pin parallel to the axis of the hub member such that the pair of blade members can pivot on the pin about the pin axis.

10. The apparatus according to claim 1 including some flat blade members each of which is defined solely by a planar cutting portion lying in a radial plane of the hub axis.

11. The apparatus according to claim 10 wherein there are more flat blade members adjacent a center of the hub member than adjacent ends of the hub member.

12. The apparatus according to claim 1 including some flat blade members each of which is defined solely by a planar cutting portion lying in a radial plane of the hub axis wherein the blade members are arranged in pairs with each one of a pair being arranged on a respective side of one of the stationary blades and with the sharpened leading edge of the blade members of each pair arranged adjacent the stationary blade, some of the pairs including one flat blade member and one fan blade member.

13. The apparatus according to claim 12 wherein there are more flat blade members adjacent a center of the hub member than adjacent ends of the hub member.

14. A chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising;

a housing having a feed opening and a discharge opening, a plurality of stationary blades mounted in the housing in axially spaced positions therealong, the stationary blades lying in parallel radial planes;

a chopping assembly mounted in the housing and comprising a hub member mounted for rotation about a longitudinal axis of the hub member and a plurality of blade members mounted on the hub member for rotation therewith about said axis, each blade member projecting generally outwardly from the hub member substantially in a radial plane of said axis, the blade members being arranged at spaced positions along the length of the hub member such that rotation of the hub member causes each blade member to pass between two of the stationary blades in a cutting action;

the feed opening being arranged to deposit the material onto the chopping assembly in a direction generally inwardly toward the axis and the discharge opening being arranged to allow discharge of the material generally radially outwardly from the chopping assembly;

some of the blade members defining fan blade members including a first planar cutting portion which lies in a radial plane of the hub axis and a second flap portion at a trailing edge of the first portion extending from the trailing edge of the first portion outwardly to at least one side of the radial plane;

the remainder of the blade members defining flat blade members each of which is defined solely by a planar cutting portion lying in a radial plane of the hub axis;

wherein there are more flat blade members adjacent a center of the hub member than adjacent ends of the hub member.

15. The apparatus according to claim 14 wherein the blade members are arranged in pairs with each one of a pair being arranged on a respective side of one of the stationary blades and with the sharpened leading edge of the blade members of each pair arranged adjacent the stationary blade, some of the pairs including one flat blade member and one fan blade member.

16. A chopper and discharge apparatus for use with a combine harvester having a combine harvester body, means for discharging separated straw from a rear discharge area of the combine harvester body, and means mounting the apparatus on the combine harvester body at a position adjacent the rear discharge area for receiving straw therefrom, the apparatus comprising;

a housing having a feed opening and a discharge opening, a plurality of stationary blades mounted in the housing in axially spaced positions therealong, the stationary blades lying in parallel radial planes;

a chopping assembly mounted in the housing and comprising a hub member mounted for rotation about a longitudinal axis of the hub member and a plurality of blade members mounted on the hub member for rotation therewith about said axis, each blade member projecting generally outwardly from the hub member substantially in a radial plane of said axis, the blade members being arranged at spaced positions along the length of the hub member such that rotation of the hub member causes each blade member to pass between two of the stationary blades in a cutting action;

the feed opening being arranged to deposit the material onto the chopping assembly in a direction generally inwardly toward the axis and the discharge opening being arranged to allow discharge of the material generally radially outwardly from the chopping assembly;

each of at least some of the blade members defining fan blade members including a first cutting portion which includes a sharpened leading edge lying in a radial plane of the axis and a trailing edge, and a second planar flap portion bent from the first portion at the trailing edge of the first portion substantially at right angles thereto so as to be contiguous with the first portion at the trailing edge and to extend from the trailing edge of the first portion outwardly to one side only of the radial plane;

wherein each fan blade member includes a connection portion contiguous with the first portion and extending therefrom to a support member on the hub member, the connection portion lying in a radial plane offset to a side of the radial plane of the first portion opposite to the second portion so as to balance the center of gravity of the blade member to lie radially outwardly of the connection portion.

17. The apparatus according to claim 16 wherein the second flap portion of each fan blade member is inclined such that a radially outer part of the second flap portion is arranged angularly forwardly of a radially inner part of the blade surface portion.

18. The apparatus according to claim 16 wherein the first portion and a part of the connection portion are beveled at the leading edge thereof to form said sharpened leading edge at a surface of the first portion and the part of the connection portion which is opposite to the second portion.

19. The apparatus according to claim 16 wherein the second portion has an outer edge which lies in a common plane with an outer edge of the first portion, said common plane lying tangential to an imaginary cylinder surrounding the axis of the hub member.

20. The apparatus according to claim 16 wherein the fan blade members are arranged in pairs with each one of a pair being arranged on a respective side of one of the stationary blades and with the second flap portion of said each one of the pair being arranged on a side of the first portion which is opposite to the stationary blade and opposite to the other one of the pair.

* * * * *